United States Patent [19]

Tokuno et al.

[11] Patent Number: 4,784,919

[45] Date of Patent: Nov. 15, 1988

[54] TRANSFER PAPER FOR IMPARTING STEREOGRAPHIC PATTERN AND MANUFACTURING METHOD THEREOF

[75] Inventors: Isao Tokuno, Sakai; Shuzo Ohara, Kawanishi, both of Japan

[73] Assignee: Goyo Paper Working, Ltd., Osaka, Japan

[21] Appl. No.: 74,400

[22] PCT Filed: Nov. 12, 1986

[86] PCT No.: PCT/JP86/00577

§ 371 Date: Jun. 17, 1987

§ 102(e) Date: Jun. 17, 1987

[87] PCT Pub. No.: WO87/02944

PCT Pub. Date: May 21, 1987

[30] Foreign Application Priority Data

Nov. 15, 1985 [JP] Japan ............................... 60-257461

[51] Int. Cl.⁴ ........................ B32B 27/00; B32B 31/00

[52] U.S. Cl. .................................... 428/500; 428/913; 428/914; 156/220; 156/234; 156/240; 156/277

[58] Field of Search ............... 156/220, 234, 240, 277; 428/500, 913, 914

[56] References Cited

U.S. PATENT DOCUMENTS 4,027,345 6/1977 Fujisawa et al. .................... 427/154

4,310,370 1/1982 Arai et al. ........................... 156/220

4,495,013 1/1985 Walker et al. ....................... 156/220

4,610,743 9/1986 Salmeen et al. ..................... 156/183

4,696,709 9/1987 Hargarten et al. .................. 156/220

*Primary Examiner*—John E. Kittle

*Assistant Examiner*—P. J. Ryan

*Attorney, Agent, or Firm*—Armstrong, Nikaido, Marmelstein & Kubovcik

[57] ABSTRACT

The present invention provides a transfer paper for imparting stereographic pattern produced by transferring the specified pattern printed on a synthetic sheet to a release layer surface of a release paper formed of a base member and the aforementioned release layer provided on the surface thereof and a manufacturing method of the transfer paper characterized in that a releasable thermoplastic resin is extruded between the base material and the sheet on which the specified pattern has been printed, thereby transferring the pattern on the aforementioned printed sheet to the surface of the aforementioned thermoplastic resin, followed by cooling, and then, said printed sheet is peeled off and separated from the surface of said thermoplastic resin. Thus this invention makes it possible to provide at low price and with ease a transfer paper for imparting stereographic perspective patterns having various grades of lusters and tones in combination.

2 Claims, 1 Drawing Sheet

TRANSFER PAPER FOR IMPARTING STEREOGRAPHIC PATTERN AND MANUFACTURING METHOD THEREOF

TECHNICAL FIELD

The present invention relates to a novel transfer paper for imparting a stereographic/pattern and a manufacturing method thereof, and further particularly pertains to transfer papers capable of imparting at low price and with ease stereographic/and perspective patterns having combinations of lusters and tones of various grades produced by way of printing and a manufacturing method thereof.

BACKGROUND TECHNIQUE

As a method of imparting stereographic/patterns on base materials formed of papers or plastic sheets, synthetic leathers, etc., embossing process has been widely practiced from old days. The general method of an embossing process is to preheat a sheet-shaped material, impress a concavo-convex pattern from a stamping roll in which the specified pattern is carved, followed by cooling, and then, take up the product.

However, the conventional embossing process involves problems such as: (1) stamping rolls on which the specified patterns are carved, equal in number to said patterns, need to be prepared, inevitably resulting in high installation cost; (2) since the luster of the embossed surface is normally uniform, it is not easy to create subtle modelings and external appearances of perspective and stereographic patterns due to grades of luster by differentiating the luster part by part; (3) under roll forming technical restrictions, the freedom of the picture pattern is naturally limited; and (4) the stamping roll needs to be replaced every time the pattern is changed, with inevitable disadvantage in work efficiency, which is fatal particularly in the case of multi-item small amount production. This invention has been reached as a result of assiduous studies carried out in an effort to solve the aforementioned problems in this technical situation.

DISCLOSURE OF THE INVENTION

A first item of this invention is a transfer paper for imparting stereographic pattern produced by transferring the specified pattern printed on a synthetic resin sheet to a release layer surface of a release paper formed of a base material and the aforementioned release layer provided thereon, and its second item is a manufacturing method of the transfer paper characterized in that a releasable thermoplastic resin is extruded between the base material and the sheet on which the specified pattern is printed, thereby transferring the pattern on the aforementioned printed sheet to the aforementioned thermoplastic resin, following by cooling, and then, said printed sheet is peeled off and separated from the surface of said thermoplastic resin. It should be noted that the word "transfer paper" also embraces sheets formed with base materials other than paper.

THE MOST PREFERABLE MODE FOR EXERCISING THE INVENTION

Figure 1:
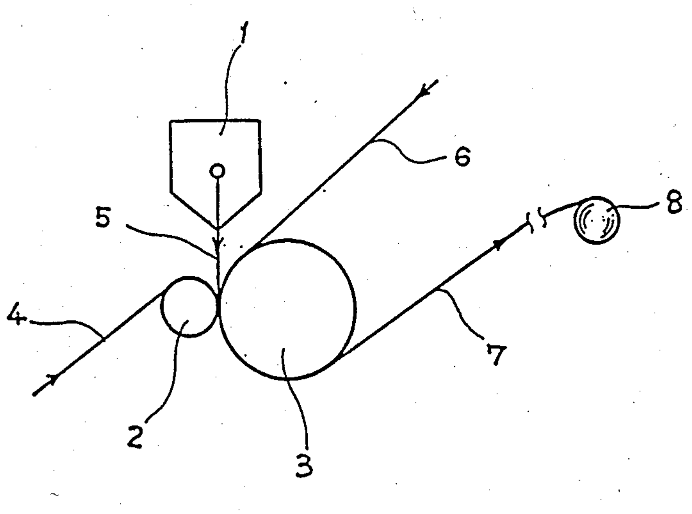
FIG. 1 is a schematic diagram illustrating the equipment used in Example 1.

According to this invention, on the synthetic resin sheet on which the pattern is printed, no limitation is particularly placed, except that it shall have high enough heat resistance to bear the temperature at which the pattern printed on said sheet is transferred to the release paper; for example, it includes sheets (or films) of polyesters like PBT, PET, etc., polyamides, polycarbonates, polypropylene, etc.

The base materials used for the release paper of this invention are not particularly limited, except that they shall have high enough heat resistance to bear the temperature at which the pattern transferred to said release paper is copies on the sheet like plastic sheet, etc., to which the stereographic pattern is to be imparted (hereinafter referred to as object sheet); as such materials, papers, cloths, synthetic resin sheets (films) such as of polyesters like PBT, PET, etc., polyamides, polycarbonates, polyacetals, polypropylene, metal foils and laminates of metal foils and synthetic resin sheets (films) may be mentioned. It should be noted that when, for example, paper is used as the base material, normally the weight used ranges from $110\sim150$ g/m$^2$ in the conventional embossing process, but in the method of this invention, adequate weight is on the order of $40\sim60$ g/m$^2$.

The release layer used according to this invention is not limited, except that it can bear the temperature at which the transfer is done on such an object sheet as plastic sheet, etc.; for example, releasable thermoplastic resins such as poly-4-methylpentene-1 (TPX), polypropylene, ethylene-propylene copolymer, etc., silicone resin, etc., and mixtures of these with additives for giving the releasable property should preferably be utilized. Any release layer thickness will do, but the usual thicknesses in the embossing process of more than 25 μm are not necessary, about $5\sim20$ μm being satisfactory. Forming of release layer on the base material may be done by the hot melt method, etc., but the extrusion process is particularly preferred from the standpoint of productivity and work efficiency.

The print layer of this invention is formed by appropriately combining in varied quantities and colors of powders or granules usable for the printing, such as metal powders, ceramic powders, metal oxides, etc., besides inks, pigments, etc., or varying these particle diameter, configuration, degree of dispersion, etc., to have combinations of various grades of lusters and tones. The pattern may be either design, picture, character, letter or code, etc., not particularly limited thereto.

As the method for transferring the aforementioned printed sheet pattern to the release paper, well-known methods, for example, moderately preheating the release layer surface of the release paper and, then, passing it between pressuring rolls, or pressing with a press, and the like methods are usable, but by the method of extrusion, the two processes—laminating the base material and the release layer, that is, manufacturing the release paper, and transferring the printed pattern to said release layer—may be performed simultaneously. This is quite advantageous.

For the extrusion process, the most preferable is the so-called sandwich laminating process in which the base material is fed in from one side, while the printed sheet is brought in from the other side, and between them, a releasable thermoplastic resin is extruded. It is, of course, possible to preferably adopt the method of first extruding a releasable thermoplastic resin on a base material, thereby forming a molten resin layer, and then, laminating the printed sheet with them, thereby transferring the pattern to said molten resin layer. In whichever case, by peeling off and separating the printed sheet from the release layer after cooling, a copying paper with the printed sheet's pattern transferred to its surface may be obtained.

For imparting the stereographic patterns using the transfer papers obtained in this way, various methods may be employed.

For example, after heating the object sheet by use of a preheating roll or an infrared heater, it is fed to under a press or between pressuring rollers, together with the transfer paper of this invention, to transfer under pressure the pattern on the transfer paper to the surface of said object sheet, followed by cooling, and then, the transfer paper is peeled off and separated therefrom, yielding a sheet to which the pattern has been imparted. In the case of resin, a method of laminating said resin layer on the transfer paper by coating or extrusion process, followed by cooling, and then, peeling it off is applicable; and in the case of an ink containing resin or metal vapor deposited layer, the method of heating and pressuring from back, followed by cooling, and then, peeling off the transfer paper, and the like methods may be applied. When the transfer paper of this invention is applied on metal vapor deposited layers, frosted lusters and tones will be obtained; accordingly, the pattern will be gradated and give rich, deeply textured, to be suitable for use on members of "byobu" (folding screen), "fusuma" (sliding partitions), wall papers, ceilings, picture frames, tea utensils, Buddhist altar fittings, marking tapes, etc. On the other hand, by direct metal vapor deposition on the transfer paper of this invention, more lustrous and clear patterns, as compared with the aforementioned products, may be produced. This method is suitable for producing light reflecting labels, etc., besides the similar uses as abovementioned.

The object sheet to which the stereographic pattern is to be imparted is not particularly limited. Resin (including expanded matters) sheets (films) and metal vapor-deposited layers, etc. may be mentioned as examples.

The stereographic pattern imparting method by use of transfer paper of this invention may be jointly used with the embossing process. In that way, unique modelings having both the microscopic and delicate stereographic and perspective feelings due to the luster grades of this invention and the macroscopic and dynamic stereographic and perspective feelings due to the concavo-convex surfaces of embossing becomes practical, whereby patterns more copious in varieties can be offered. In the following, the present invention will be explained in connection with its preferred embodiment, but it will not be restricted thereby.

EXAMPLE 1

Using the equipment shown in FIG. 1 and with use of polypropylene (manufactured by Mitsui Petroleum Chemical Company "LA221") sa a releasable thermoplastic resin, extrusion was made from a T die extrusion laminator (1) (diameter 115 mm, L/D25) under conditions of T die outlet resin temperature 290° C. and screw revolution 130 rpm. A quality paper (52.3 g/m$^2$) was used as the base material (4); the surface to be in contact with the aforementioned resin (molten film) (5) was subjected to corona discharge treatment (30W/M$^2$/min). On the other hand, a printed sheet (6) was so arranged as to bring the specified pattern printed on the surface thereof in contact with the aforementioned resin. These two parties were pressure-bonded (pressure 35 kg/cm$^2$) by means of a press roll (2) with the resin pinched between them (generally called poly-sandwich), whereby a laminating process was run at a rate of 150 m/min and to a resin thickness of 20 $\mu$m and a formed width of 1600 mm. Then after cooling on a cooling roll (3), said laminate (printed sheet/resin/base material) (7) was integrally wound on a take-up reel (8).

Then by peeling the printed sheet (6) from the resin surface of the laminate thus taken up, a transfer paper to which the intended pattern was exactly transferred was obtained.

As this transfer paper was coated with urethane resin, followed by cooling, and then, released therefrom, a urethane resin sheet to which a delicate stereoscopic pattern was imparted was obtained.

By making metal vapor deposition on the urethane resin sheet to which the stereoscopic pattern had been imparted, a sheet suitable for use as a marking tape or on "byobu", etc. was obtained.

POSSIBILITY OF INDUSTRIAL UTILIZATION

As described in the foregoing, undermentioned advantages will be derived from this invention:

(1) It is proper to prepare a printed sheet in place of the conventional stamping roll; therefore, the installation cost will be greatly cut down.

(2) The pattern drawing by printing is by far easier and highly diversified, as compared with carving of roll surface, thus contributing to conspicuous enhancement of pattern's freedom and improvement in cultural lives.

(3) Microscopic and delicate stereographic perspective feelings which can not be gotten by the conventional embossing process are realizable.

(4) Expression of the unique pattern possessing both the microscopic and delicate stereographic perspective feelings obtained by this invention and the macroscopic and dynamic stereographic and perspective feelings obtained by the embossing process is made possible through its combination with the latter.

(5) Change of pattern may be made merely by replacing the printed sheet. Accordingly, this method is particularly suitable for multi-item small production.

(6) Since thin base material and release layer are usable, as compared with the conventional embossing process, material cost is greatly cut down for the benefit of economy.

(7) Productivity of "byobu" and "fusuma", etc. is very low, requiring high degree of proficiency, because they are formed by a method of joining a plural member of metal foils. When the transfer sheet of this invention is utilized, exactly the same appearance as the conventional joined metal foils can be produced with ease and in large quantity with a sheet formed by metal vapor deposition, thus making it possible to offer low priced "byobu" and "fusuma" without requiring high degree of skill. And many other advantages will be derived.

We claim:

1. A transfer paper for imparting a stereographic pattern formed by transferring a specific stereographic pattern printed on a synthetic resin sheet to a release layer of a release paper comprising a base material and said release layer provided thereupon, said synthetic resin sheet being formed of at least one member selected from the group consisting of polyesters, polyamides, polycarbonates, polyacetals and polypropylene, said base material being selected from the group consisting of paper, cloth, synthetic resin films, metal foils and laminates of metal foils and synthetic resins, and said release layer being formed of at least one member selected from the group consisting of poly-4-methylpentene-1, polypropylene, ethylene-propylene copolymer and silicone resins.

2. A method of manufacture of a transfer paper wherein a releasable thermoplastic resin is extruded between a base material and a printed sheet upon which a specified stereographic pattern has been printed, thereby transferring the pattern on said pattern sheet to the surface of said thermoplastic resin, followed by cooling, peeling-off and separating said printed sheet from the surface of said thermoplastic resin, and said synthetic resin sheet being formed of at least one member selected from the group consisting of polyesters, polyamides, polycarbonates and polypropylene said base material being selected from the group consisting of paper, cloth, synthetic resin films, metal foils, laminates of metal foils and synthetic resins, and said releasable thermoplastic resin being formed of at least member selected from the group consisting of poly-4-methypentene-1, polypropylene, ethylenepolypropylene copolymer and synthetic resins.

* * * * *